Figure 1:
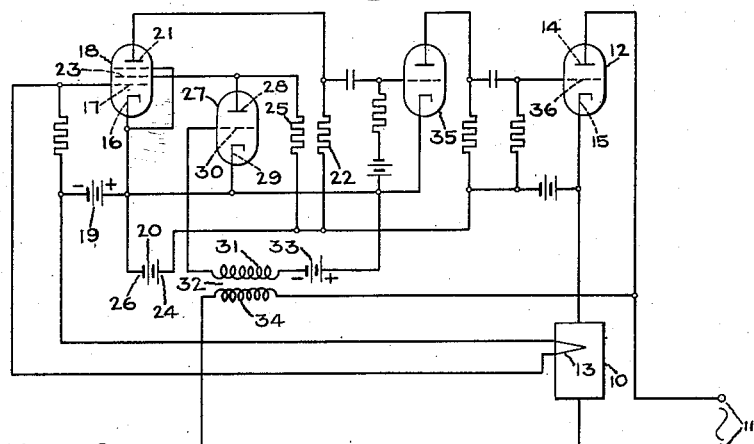

Dec. 24, 1940.  H. W. PIEPLOW  2,226,288
SYSTEM FOR AMPLIFICATION OF DIRECT VOLTAGES
Filed May 26, 1937

Inventor:
Hans W. Pieplow,
by Harry E. Dunham
His Attorney.

Patented Dec. 24, 1940

2,226,288

UNITED STATES PATENT OFFICE 2,226,288

SYSTEM FOR AMPLIFICATION OF DIRECT VOLTAGES

Hans Werner Pieplow, Berlin, Germany, assignor to General Electric Company, a corporation of New York Application May 26, 1937, Serial No. 144,968
In Germany July 15, 1936

6 Claims. (Cl. 250—27)

My invention relates to circuit arrangements for the amplification of small unidirectional voltages wherein, before the amplification of the voltage, the direct current in the circuit the voltage of which is to be amplified is converted into a pulsating or an alternating current.

Difficulties have been encountered heretofore in the measurement and the practical utilization of very small unidirectional voltages, particularly where small variations in the value of unidirectional voltage have been utilized for operating a measuring instrument, or for the control of regulating devices such as devices for the regulation of electric furnace temperatures, for example. Amplification of small unidirectional voltage by means of a direct current amplifier has not proved altogether successful since slow oscillations of the amplified voltage have occurred by reason, for example, of irregularities of the amplifier tube characteristic, causing a corresponding slow oscillation or shifting of the zero points of the instruments connected to the amplifier.

To avoid these difficulties it has been suggested heretofore to conduct the direct voltage which is to be measured to a sensitive galvanometer the pointer deflection of which is noted mechanically, optically or electrically by the observer. It has also been suggested heretofore to interrupt periodically the current in the circuit the unidirectional voltage of which is to be measured, and thereupon to amplify further the pulsating or alternating current thus produced, the periodic interruption of the current being accomplished by vibrating contacts or similar means.

The first method, that involving the use of a sensitive galvanometer, is open to the objection that it necessitates a complicated construction and that the mechanical sensitivity of the galvanometer to vibrations or other outside influences is very marked. The second method has been found to be open to the objection that the voltage of the rectified current varies undesirably in accordance with the contact potentials of the vibrating or rotating interrupters.

In accordance with my invention the above-mentioned and other difficulties are avoided by the provision of an inverting and amplifying circuit arrangement including a space discharge device, such as a pentode, having at least a control grid and a screen grid, and which is controlled by one of its grids in accordance with the amplitude of the unidirectional voltage to be amplified, and which, further, is caused to be periodically conductive and non-conductive in accordance with voltages impressed on a second grid, through a control tube, from a source of alternating current, the unidirectional voltage impressed on the input circuit of the pentode being, therefore, converted by the pentode into a pulsating voltage for amplification, without encountering the above-mentioned contact potential and other difficulties.

Further in accordance with my invention, the circuit arrangement may be such that the grid voltage of the control tube, which produces the alternating voltage impressed on one of the pentode grids, varies in accordance with the current flowing in the last amplifier of a multistage alternating voltage amplifier which follows the pentode.

My invention will be better understood from the following description when considered in connection with the accompanying drawing and its scope will be pointed out in the appended claims.

Figure 2:
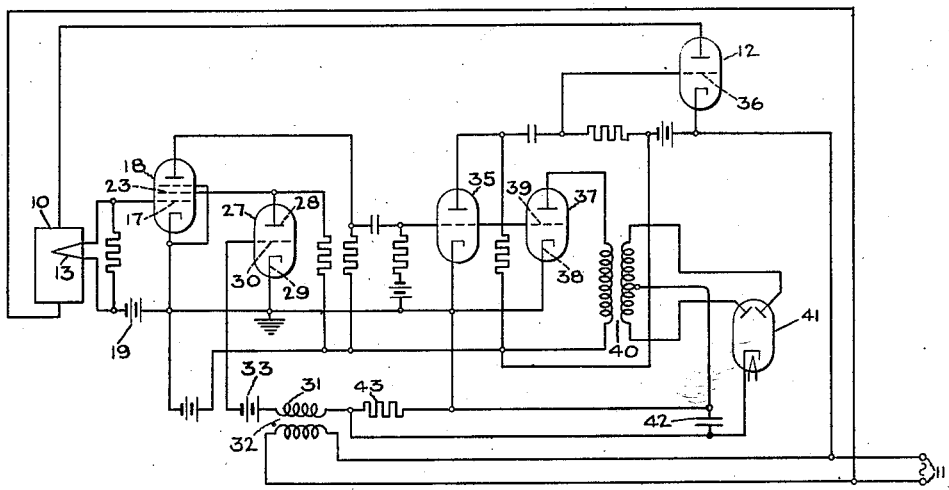
Figure 3:
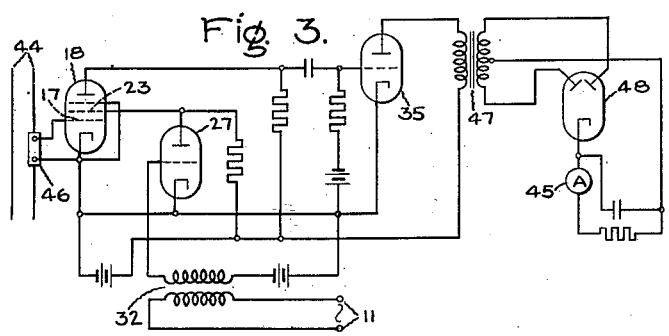

Referring to the drawing, Fig. 1 is a diagrammatic representation of a circuit arrangement for furnace temperature control in which my invention is embodied, Fig. 2 is a modification of the system illustrated in Fig. 1, and Fig. 3 is a diagrammatic representation of a system employing the inverter and amplifier arrangement of Fig. 1 but utilized in connection with a measuring instrument.

In Fig. 1, the numeral 10 indicates an electric furnace or oven connected to an alternating current heating source 11 through a vapor electric discharge device or tube 12. The furnace is provided with a thermocouple 13 for controlling, in a manner to be explained hereinafter, the mean value with respect to time of the furnace heating current which flows to the furnace from source 11 through the output circuit, including anode 14 and cathode 15, of tube 12. The terminals of the thermocouple 13 are connected respectively to the cathode 16 and one of the grids, for example the control grid 17 of a space discharge device 18 which is preferably a pentode, a source 19 of biasing potential being connected in series in the thermocouple circuit. A source 20 of anode current is connected to the anode 21 of pentode 18 through a resistance 22.

A second grid 23 of pentode 18, which in the present embodiment is the screen grid, is connected to the positive terminal 24 of anode current source 20 through a resistance 25 and to the negative terminal 26 of source 20 through a space discharge device or control tube 27. The latter tube includes an anode 28 and a cathode 29 connected respectively to grid 23 and cathode 16 of pentode 18, and a grid or control electrode 30 connected to cathode 29 through a secondary winding 31 of a transformer 32 and a source 33 of biasing potential. The transformer 32 includes a primary winding 34 connected to the terminals of the furnace current source 11.

To amplify the output of pentode 18, an amplifier is provided which may include a plurality of amplifier tubes in cascade, or, as illustrated in Fig. 1, the amplifier may be constituted by a single amplifier tube 35 which may be capacitively or otherwise connected to the anode-cathode circuit of the pentode. The output circuit of the amplifier represented by tube 35 is connected capacitively or in any other suitable manner to a utilization circuit which, in the present embodiment, comprises the input circuit, including the cathode 15 and a grid or control electrode 36, of vapor electric discharge device or tube 12.

In operation of the furnace control system shown in Fig. 1, an alternating voltage due to transformer 32 which is connected to the alternating current source 11 is impressed upon the grid 30 of the control tube 27. The negative bias from source 33 on grid 30 of control tube 27 is more than enough to reduce the anode current of this tube to zero when no voltage is being supplied to grid 30 from transformer 32. The alternating voltage supplied by the transformer 32 is such that when this voltage is impressed on grid 30, large pulses or amplitudes of anode current are allowed to flow during a portion of each positive half-cycle of the alternating voltage, the alternating voltage on grid 30 becoming sufficiently positive at each cycle to allow saturation anode current to flow in the tube 27. A positive pulsating voltage of large amplitude and of the frequency of the alternating voltage of source 11 is, therefore, impressed upon grid 23 of the pentode 18 by reason of the connection of this grid to the output circuit of control tube 27. Similarly to control tube 27, the negative grid bias impressed by source 19 on grid 17 of pentode 18 is preferably more than sufficient to reduce its anode current to zero when no pulsating voltage is being supplied to grid 23 from tube 27. The pulsating voltage of large amplitude from tube 27 when impressed on grid 23 allows current pulses of correspondingly large amplitude to flow in the anode circuit of tube 18 during a portion of each cycle of the pulsating grid voltage. The tube 18 is preferably operated well into the anode current saturation range in order to balance out undesired variations in the anode voltage.

Simultaneously with the impressing of the pulsating voltage from tube 27 on grid 23 of pentode 18, a unidirectional bias voltage, due to the thermocouple 13 and source 19 and varying relatively slowly in accordance with variations in the temperature within furnace 10, is impressed upon grid 17 of the pentode.

By the combined action of the biasing grid 17 and of grid 23 and the tube 27 associated therewith, a pulsating voltage is produced in the output circuit of pentode 18 having a mean value which varies in accordance with the variations in the thermocouple circuit voltage. The pulsating voltage in the output circuit of pentode 18 is impressed on amplifier 35 and the corresponding alternating voltage in the output of amplifier 35 is in turn impressed upon the grid-cathode circuit of the vapor electric discharge device 12. The thermocouple 13 is so connected to the control circuit of tube 18 including the grid 17 that when the thermocouple current increases, due to temperature rise in furnace 10 above a desired value, the alternating voltage impressed on grid 36 of tube 12 decreases, and similarly when the thermocouple current decreases, due to fall of the furnace temperature below the desired value, the voltage impressed on grid 36 of tube 12 rises. The electrode arrangement in tube 12 is such that when the alternating voltage impressed on its grid 36 by amplifier 35 is below a predetermined value no current flows in the anode-cathode circuit of tube 12, the heating current for furnace 10 thereby being cut off but when the voltage impressed on grid 36 rises above the predetermined value current again flows in the anode-cathode circuit of tube 12 and through the furnace 10. The desired mean temperature in furnace 10 is therefore maintained.

The control of the heating current for furnace 10 as accomplished by the circuit arrangement shown in Fig. 1 is thus of the "on and off" type, or that type of control wherein at each "on" period, the heating current flows at full strength for a considerable time, until the temperature of the furnace rises above a desired value by a predetermined amount. The current is then cut off, and remains cut off, during the "off" period, for a considerable time, until the furnace temperature falls below the desired value by a predetermined amount. This process is repeated indefinitely, in operation of the system, to insure a desired substantially constant temperature in the furnace.

It is often desirable to employ instead of an "on and off" system for the control of heating current for electric furnaces, or like uses, a system wherein the current control is continuously variable. In the modification shown in Fig. 2, which is similar in certain respects to the above-described system shown in Fig. 1, continuously variable control of the heating current for furnace 10 is accomplished by the provision of means for changing the phase of the potential impressed on grid 36 of vapor electric device 12 with respect to the voltage of source 11 in accordance with the voltage variations of thermocouple 13, which are due to corresponding variations of the temperature within furnace 10. For this purpose, to the circuit arrangement shown in Fig. 1 is preferably added in Fig 2 another amplifier 37 having its cathode 38 and grid 39 connected respectively in parallel with the cathode and grid of amplifier 35. The output circuit of tube 37 is connected through a transformer 40 to a rectifier 41, which is arranged to supply current to a bias resistor 43 connected, in parallel with a condenser 42, in the grid-cathode circuit of control tube 27 and in series with the secondary 31 of transformer 32. The fixed bias potential source 33 is provided in series with resistor 43 in the grid-cathode circuit of tube 27.

In operation of the system shown in Fig. 2, similarly to operation of the corresponding parts in the system shown in Fig. 1: an alternating voltage from source 11 is impressed on grid 30 of tube 27 through transformer 32, and a negative bias is impressed on grid 30 from source 33, which is more than sufficient to reduce the anode current of tube 27 to zero when no alternating voltage is being supplied to tube 27. Large pulses of current are thereby caused to flow in tube 27 at each half cycle and a pulsating voltage of large amplitude is impressed on grid 23 of pentode 18. A negative bias is impressed on grid 17 of pentode 18 from source 19, which is more than sufficient to reduce the anode current of the pentode to zero when no voltage is being supplied to grid 23, the bias on grid 17 varying, by reason of the varying voltage of thermocouple 13, in accordance with temperature variations in furnace 10. Large current pulses slowly varying in amplitude are thereby caused to flow in tube 18, in accordance with the furnace temperature variations, and a corresponding pulsating voltage of slowly varying amplitude is produced in the output circuit of the latter tube.

In the system shown in Fig. 2, however, the output voltage of pentode 18 is impressed on the grid 39 of the additional amplifier 37 and the output of amplifier 37 is rectified in rectifier 41, the direct current from rectifier 41 thus flowing in resistor 43, across which the condenser 42 is connected to insure a relatively steady current flow in resistor 43. Since the output current of amplifier 37 is controlled by the output voltage of pentode 18, which varies correspondingly with the furnace temperature, the rectified current in resistor 43 also varies correspondingly with the furnace temperature. The voltage drop in resistor 43 thus supplies a varying component to the negative bias impressed on grid 30 of tube 27, the combined bias voltage being due to the voltage of source 33 and the above-mentioned voltage drop in resistor 43. Preferably the combined bias voltage on grid 30 is always more than enough to reduce the anode current of tube 27 to zero when no alternating voltage is being supplied to this tube by transformer 32. The timing of the initiation of the pulses of current flow in tube 27, due to the alternating voltage impressed on grid 30 from source 11 through transformer 32, is determined by the bias voltage, and the change in this timing, with respect to the alternating voltage, is in accordance with the changes in bias voltage due to the varying voltage drop through resistor 43.

The phase of the wave front of the current pulses in tube 27 with respect to the voltage waves of source 11 is therefore varied in accordance with the variations in the temperature within furnace 10. These phase changes are repeated in the output voltage of pentode 18 and in the output voltage of amplifier 35 upon which the output voltage of pentode 18 is also impressed.

Since the output voltage of amplifier 35 is impressed on grid 36 of vapor electric device 12, a corresponding change of phase of the grid voltage of device 12 with respect to the anode voltage of the latter device is produced. The arrangement of the system shown in Fig. 2 is such that the voltage impressed on grid 36 of device 12 is sufficient to cause the initiation of anode current flow therein at each positive half-cycle of the voltage supplied from source 11, the control of the mean value of current being accomplished, in a well-known manner, by the phase shift of the grid voltage. The system is so arranged that when the furnace temperature drops below, or rises above, a predetermined value the phase of the voltage on grid 36 is correspondingly advanced or retarded with respect to the anode supply voltage. The heating current in furnace 10 is thereby continuously varied to maintain approximately a desired temperature therein.

The inverting and amplifying arrangement included in the system shown in Fig. 1 may be utilized not only in connection with regulating devices, for example for the control of electric furnace temperatures as illustrated in Figs. 1 and 2, but may be used also in connection with usual measuring instruments, and especially for the operation of large switchboard instruments. Thus the system illustrated in Fig. 3 is so arranged that an electrical condition in a circuit 44 is indicated by a suitable meter 45. For this purpose the inverting and amplifying portion of Fig. 1 including alternating current source 11, transformer 32, control tube 27 pentode 18, and amplified 35 are provided. In the system shown in Fig. 3, however, to measure an electrical condition in circuit 44, for example to measure the current in this circuit, a suitable means such as a shunt 46 in circuit 44 may be connected across that one of the input circuits of pentode 18 which includes the grid 17, and the output circuit of amplifier 35 may be connected through a transformer 47 to a rectifier 48, in the output circuit of which is connected the meter 45. In operation, a pulsating voltage of the frequency of the voltage in alternating current source 11 appears in the output circuit of pentode 18, varying in amplitude in accordance with the variations in the direct voltage impressed on grid 17 from the circuit 44. The pulsating output voltage of pentode 18 is impressed on amplifier 35 and the output current thereof is rectified in rectifier 48. The direct current from rectifier 48 flows through the meter 45 which is suitably calibrated to indicate the current in circuit 44.

The system illustrated in Fig. 3 is suitable for installations employing very large currents, wherein an exceedingly small shunt is sufficient for supplying the control voltage which is to be inverted and amplified as described. The system of Fig. 3 is also suitable for installations employing direct current of high potential, wherein the inverting and amplifying portion including tubes 18, 27 and 35 may be at the high potential, the output transformer 47 being arranged to function as an insulating transformer for the inverting and amplifying portion.

In the system illustrated in Figs. 1, 2 and 3 the screen grid 23 of the pentode 18 is shown as connected to function as the "switch grid," i. e., the grid which is connected to the control tube 27 to cause tube 18 to be alternately conducting and non-conducting at the frequency of source 11. It is to be noted, however, that by suitable construction and arrangement of the tube elements it is also possible to employ the control grid 17 as the "switch grid" and the screen grid 23 as the control grid.

My invention has been described herein in particular embodiments for purposes of illustration. It is to be understood, however, that the invention is susceptible of various changes and modifications and that by the appended claims I intend to cover any such modifications as fall within the true spirit and scope of my invention.

What I claim as new and desire to secure by Letters Patent of the United States is:

1. In an electric system for the amplification of a unidirectional voltage, a space discharge device including an anode, a cathode, a control grid, and a screen grid, a circuit between said anode and cathode, means to supply a control voltage to one of said grids to produce a pulse of voltage in said circuit between said anode and cathode during a portion only of each cycle of said control voltage, means to supply said unidirectional voltage to the other of said grids to control the amplitude of said pulses of voltage, means comprising an amplifying device having an output circuit to amplify the alternating voltage in said circuit, and means comprising a rectifying device connected to said output circuit to produce a second unidirectional voltage varying in accordance with said first-named unidirectional voltage.

2. In an electric system for the amplification of a unidirectional voltage, a space discharge device including an anode, a cathode, and at least two grids, a circuit between said anode and cathode, means to produce spaced pulses of voltage in said circuit of said device including means to impress corresponding spaced pulses of voltage on one of said grids, means to impress said unidirectional voltage on another of said grids to control the amplitude of said pulses of voltage in said circuit, means comprising an amplifying device having an output circuit to amplify the alternating voltage in said circuit, and means comprising a rectifying device connected to said output circuit to produce a second unidirectional voltage varying in accordance with said first-named unidirectional voltage.

3. In an electric system for the amplification of a unidirectional voltage, a space discharge device including an anode, a cathode, a control grid, and a screen grid, a circuit between said anode and cathode, a source of alternating voltage, means to produce in said circuit between said anode and cathode spaced pulses of voltage occurring at the frequency of said source, said means including a space discharge device interposed between said source and one of said grids, means to impress said unidirectional voltage on the other of said grids to control the amplitude of said pulses of voltage in said circuit, means comprising an amplifying device having an output circuit to amplify the anode-cathode circuit alternating voltage, and means comprising a rectifying device connected to said output circuit to produce a second unidirectional voltage varying in accordance with said first-named unidirectional voltage.

4. In an electric system for the amplification of a unidirectional voltage, a space discharge device including an anode, a cathode, a control grid, and a screen grid, a circuit between said anode and cathode, a source of alternating voltage, means including a space discharge device interposed between said source and one of said grids to produce a periodically varying voltage in said circuit of said first-named device, said second-named device having a control electrode, means to impress said unidirectional voltage on the other of said grids to control the amplitude of said anode-cathode circuit voltage, an amplifier, means to impress said anode-cathode circuit voltage on said amplifier, and means to vary the potential of the control electrode of said second-named device in accordance with the current in said amplifier.

5. In an electric system for the amplification of a unidirectional voltage, a space discharge device including an anode, a cathode, a control grid, and a screen grid, a circuit between said anode and cathode, an alternating voltage source, means to produce a periodically varying voltage in said circuit of said first-named device including a space discharge device interposed between said source and one of said grids, said second-named device having a control electrode, means to impress said unidirectional voltage on the other of said grids to control the amplitude of said voltage in said circuit, an amplifier having an input circuit and an output circuit, means to connect said output circuit to a utilization circuit, a second amplifier having an input circuit connected in parallel with said first-named input circuit, means to impress said voltage of said circuit between said anode and cathode on said second-named input circuit, and means including a rectifier and a resistor connected thereto to vary the potential of said control electrode in accordance with the current in said second-named amplifier.

6. In an electric system, means to produce a unidirectional voltage, a space discharge device including an anode, a cathode, a control grid, and a screen grid, a circuit between said anode and cathode, an alternating voltage source, means to produce in said anode-cathode circuit of said device spaced pulses of voltage occurring at the frequency of said source, said means including a space discharge device interposed between said source and one of said grids, means to impress said unidirectional voltage on the other of said grids, a load device, means comprising an amplifying device having an output circuit to amplify the anode-cathode circuit alternating voltage of said device, and means comprising a rectifying device connected between said output circuit and said load device to impress on said load device a second unidirectional voltage varying in accordance with the amplified alternating voltage in said output circuit.

HANS WERNER PIEPLOW.